United States Patent [19]

Eilam et al.

[11] Patent Number: 5,540,017
[45] Date of Patent: Jul. 30, 1996

[54] TELESCOPIC FLAGPOLE

[75] Inventors: Ido Eilam, Brookline; Al Ouellette, Saugus, both of Mass.

[73] Assignee: JIL Industries Limited Partnership, Malden, Mass.

[21] Appl. No.: 370,525

[22] Filed: Jan. 9, 1995

[51] Int. Cl.⁶ .................................................. B66C 23/62
[52] U.S. Cl. ........................... 52/118; 52/632; 52/726.3; 248/188.5; 248/408
[58] Field of Search ........................... 52/118, 632, 298, 52/726.1, 726.3, 726.4, 736.1, 736.3, 736.4; 248/188.5, 423, 414, 407, 408

[56] References Cited

U.S. PATENT DOCUMENTS

| | | |
|---|---|---|
| 859,233 | 7/1907 | Lane . |
| 1,264,063 | 4/1918 | Guichard . |
| 1,482,036 | 1/1924 | Schablow . |
| 1,804,293 | 5/1931 | Warzoha . |
| 2,368,692 | 2/1945 | Wallance ........................ 52/632 X |
| 2,711,918 | 6/1955 | Benson . |
| 2,841,634 | 7/1958 | Kimball ........................... 52/632 |
| 3,103,375 | 9/1963 | McMullin . |
| 3,263,382 | 8/1966 | Tourtellotte ..................... 52/118 X |
| 3,612,145 | 10/1971 | Darula et al. ..................... 160/67 |
| 3,697,098 | 10/1972 | Fisher ............................ 280/415 |
| 3,734,441 | 5/1973 | Lux . |
| 3,842,561 | 10/1974 | Wong ............................. 52/484 |
| 4,062,156 | 12/1977 | Roth .............................. 52/111 |
| 4,111,217 | 9/1978 | Victor ............................ 135/15 |
| 4,196,491 | 4/1980 | Baril ........................... 15/230.11 |
| 4,357,785 | 11/1982 | Eklund ........................... 52/632 |
| 4,406,097 | 9/1983 | Meston ........................... 52/118 |
| 4,490,063 | 12/1984 | Aho ............................. 403/109 |
| 4,513,938 | 4/1985 | Seymour .......................... 248/407 |
| 4,709,517 | 12/1987 | Mitchell et al. ................... 53/36 |
| 4,731,961 | 3/1988 | Bona ............................. 52/63 |
| 4,918,896 | 4/1990 | Wiese ............................ 52/632 |
| 5,160,174 | 11/1992 | Thompson ......................... 285/32 |

*Primary Examiner*—Kien T. Nguyen
*Attorney, Agent, or Firm*—Weingarten, Schurgin, Gagnebin & Hayes

[57] ABSTRACT

A telescopic flagpole comprises at least two concentrically disposed tubular segments that are axially movable with respect to each other. A locking device housed within an inner segment includes a pin that is biased to extend from the inner segment through a hole in the adjacent outer segment to prevent relative axial movement of the segments. Additionally, a screw mounted in a bushing at one end of an outer segment can be tightened against, passed into, or passed through a portion of the adjacent inner segment to inhibit relative axial movement of the juxtaposed segments. The screw can have an uncommon head configuration to reduce the possibility of unauthorized or unintentional loosening of the screw. Relative rotation of adjacent segments is inhibited by providing an outer segment with an inwardly projecting ridge that engages a notch in the adjacent inner segment. Alternatively, the ridge can engage a notch in a plug inserted into the end of the adjacent inner segment.

5 Claims, 5 Drawing Sheets

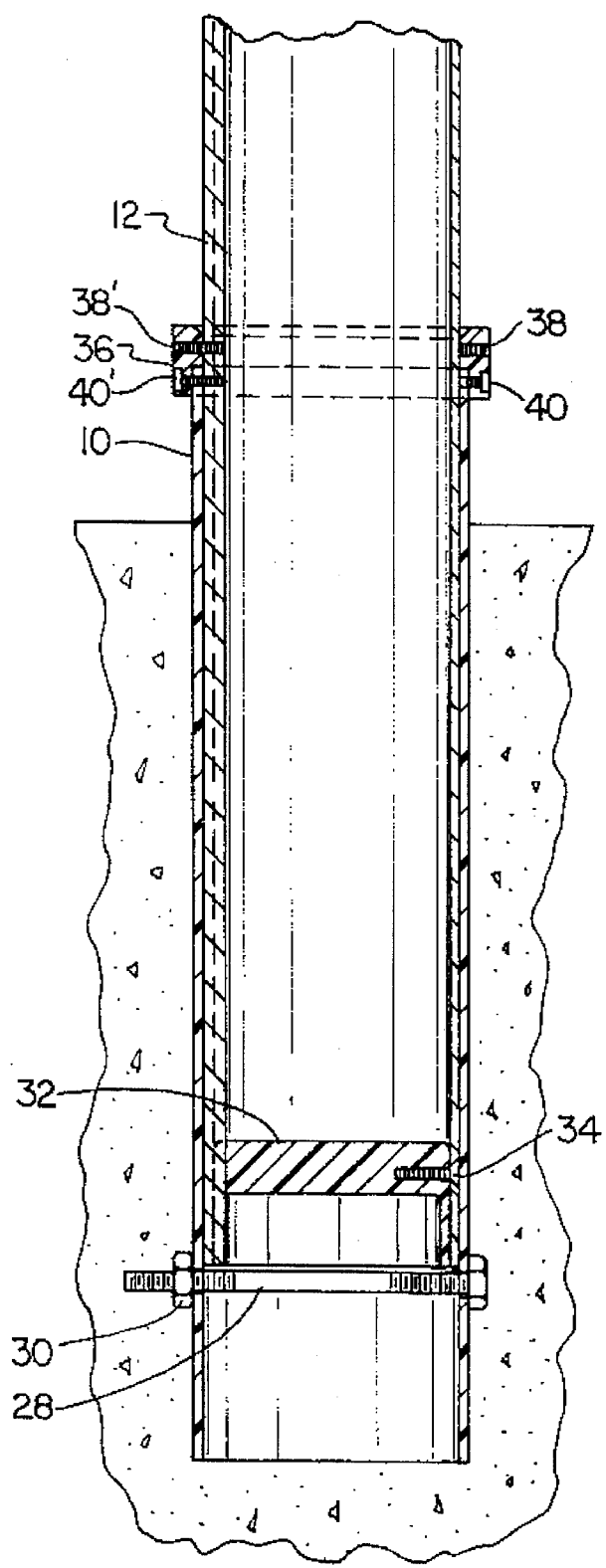
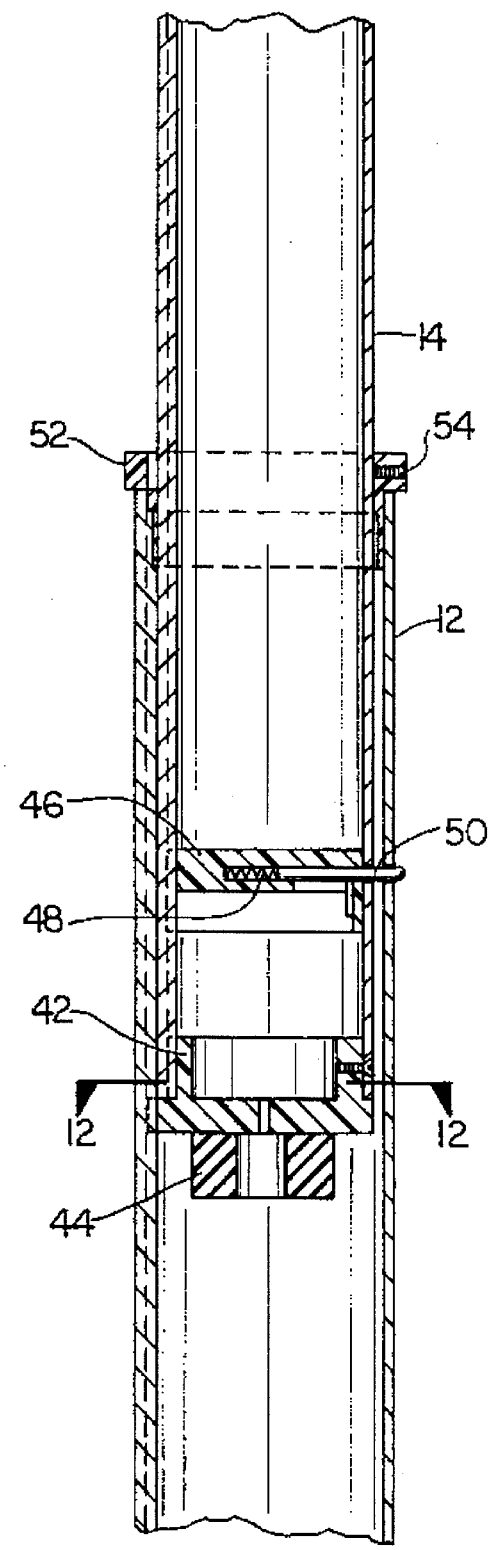
FIG. 3
FIG. 4

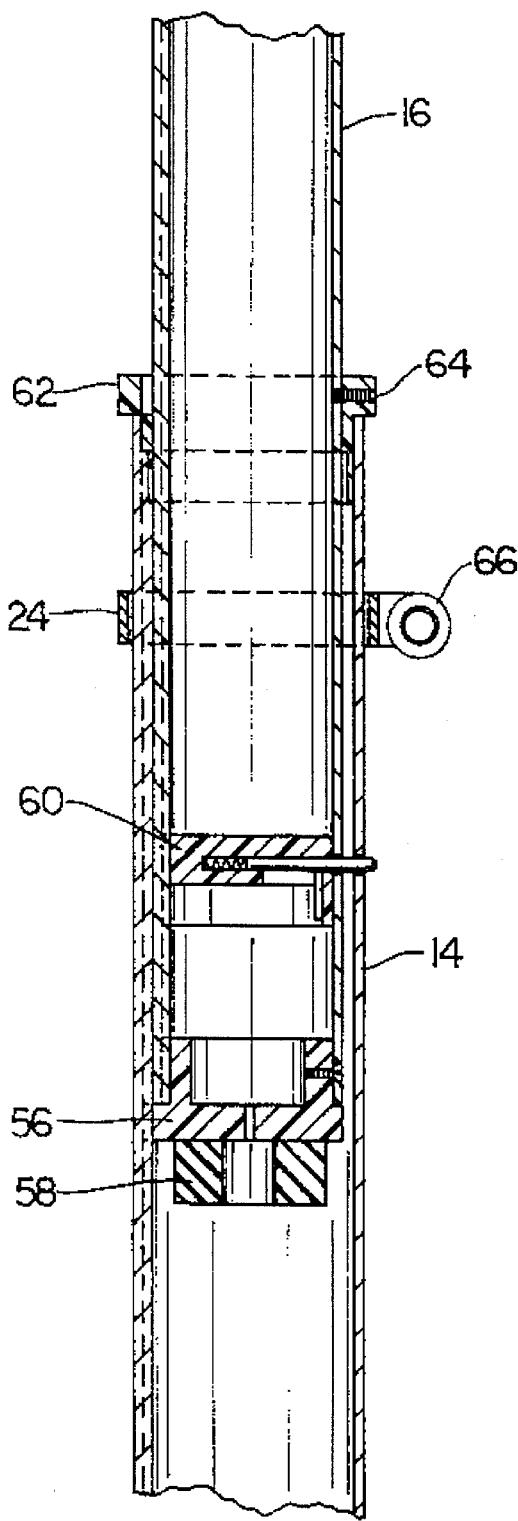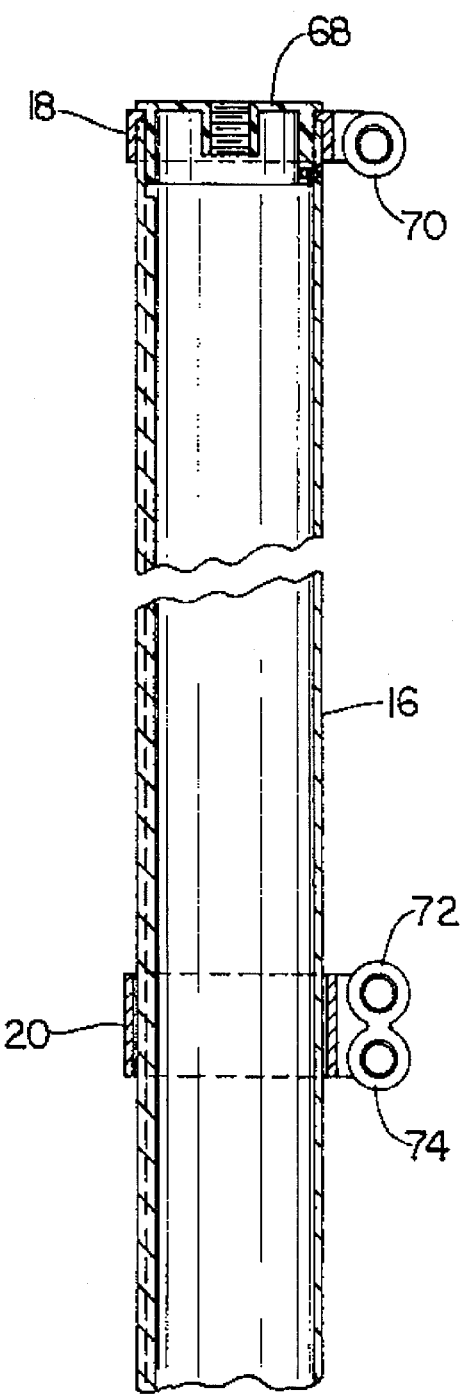
FIG. 5
FIG. 6

TELESCOPIC FLAGPOLE

FIELD OF THE INVENTION

The present invention relates to flagpole, and more telescopic flagpole.

BACKGROUND OF THE INVENTION

A telescopic flagpole includes two or more tubular sections that are slidably engagable along their longitudinal axes to provide an extendable and collapsible pole to which one or more flags may be affixed. By contrast, traditional flagpoles are rigid, one-piece tubular elements.

When a one-piece flagpole 25 to 50 or more feet in height is selected for installation, the length of the pole poses transportation difficulties and renders the pole unwieldy to install, especially in confined sites. Once the one-piece pole is installed, reaching the upper portion of the pole is difficult.

Unlike a long, one-piece flagpole, a telescopic flagpole is much easier to transport. Following installation, access to the top of the pole is achieved by collapsing the pole. However, inherent to the telescopic capability of such a pole is the challenge of ensuring that the extended pole does not inadvertently collapse.

SUMMARY OF THE INVENTION

The present invention is directed to an improved telescopic flagpole that includes features that make the pole easily extended and locked into an extended position and which provides benefits with respect to installation, safety, and theft protection.

In an illustrative embodiment, a telescopic flagpole includes two or more concentrically disposed tubular segments that are axially movable with respect to each other. Relative movement of the segments can be inhibited with a locking device housed within one or more of the inner segments. The locking device can include a pin that is biased to extend from the respective inner segment through a hole in the adjacent outer segment.

Additional security/safety is provided by a screw mounted in a bushing at one end of one or more of the outer segments. If the screw is tightened against, inserted into, or passed through a wall portion of the adjacent inner segment, relative movement of the segments is inhibited. An uncommon screw head configuration reduces the possibility of unauthorized or unintentional loosening of the security/safety screw.

Another feature of the invention relates to inhibiting relative rotation of adjacent segments. For example, in one embodiment of the telescopic flagpole, one or more of the outer segments includes an inwardly projecting ridge that engages a notch in the adjacent inner segment or a notch in a plug inserted into the end of the adjacent inner segment.

BRIEF DESCRIPTION OF THE DRAWINGS

These and further features of the invention will be better understood with reference to the accompanying specification and the drawings in which:

FIG. 3 is a sectional view of the telescopic flagpole of FIG. 1 taken along line 3—3;

FIG. 4 is a sectional view of the telescopic flagpole of FIG. 1 along line 4—4;

FIG. 5 is a sectional view of the telescopic flagpole of FIG. 1 along line 5—5;

FIG. 6 is a sectional view of the telescopic flagpole of FIG. 1 along line 6—6;

DETAILED DESCRIPTION OF THE INVENTION

Figure 1:
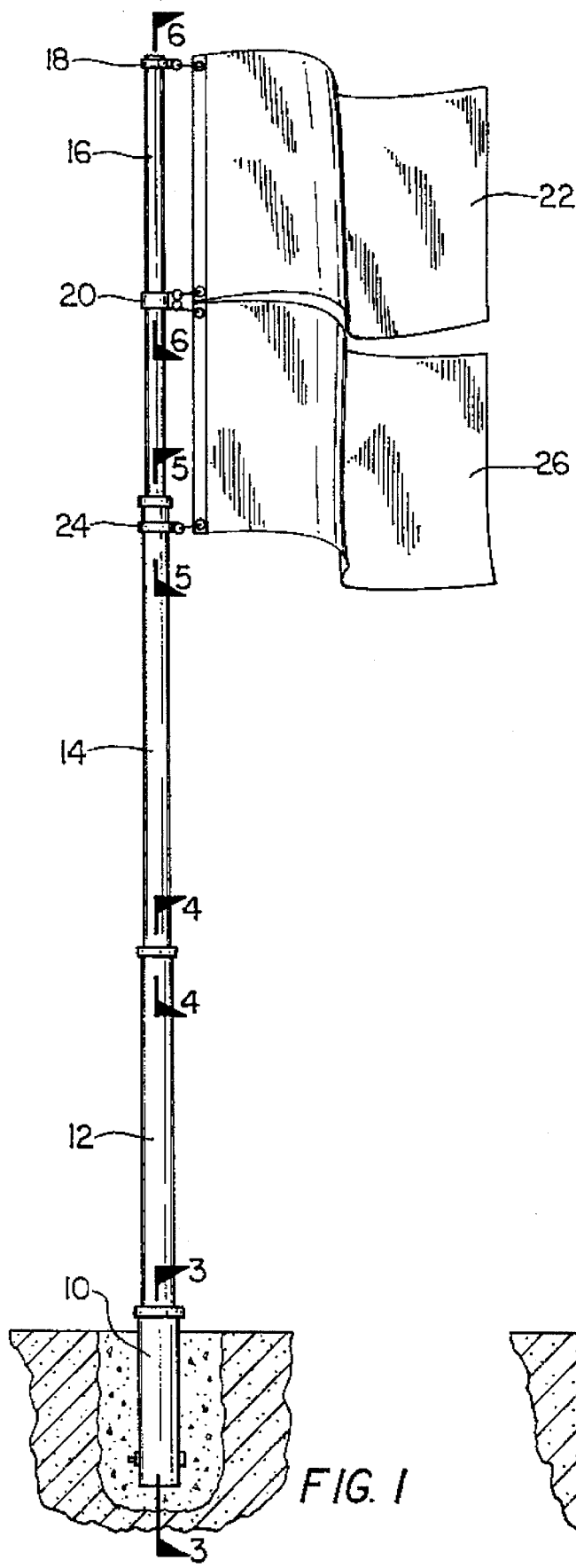
FIG. 1 is a side elevational view of a telescopic flagpole in an extended state and installed in the ground.

Referring to FIG. 1, a telescopic flagpole (hereinafter "flagpole") according to the present invention is shown in an extended state. The flagpole comprises a base 10, a first segment 12, a second segment 14, a third segment 16. A first swivel 18 and a second swivel 20 are provided for securing a first flag 22 to the pole. A third swivel 24 and the second swivel 20 are provided for securing a second flag 26 to the pole.

In the illustrative embodiment, each of the segments 12, 14, 16 are hollow aluminum tubes having a wall thickness of about 0.06 inches and a length of approximately six feet. The segments may be fabricated from other materials such as plastic, fiberglass, or steel. The thickness of the selected material is a function of the tensile strength of the material and the maximum expected load that the flagpole will be subjected to plus a safety factor. Although the illustrated embodiment of the flagpole has three segments 12, 14, and 16, other embodiments have fewer or more segments in accordance with particular application requirements.

Figure 2:
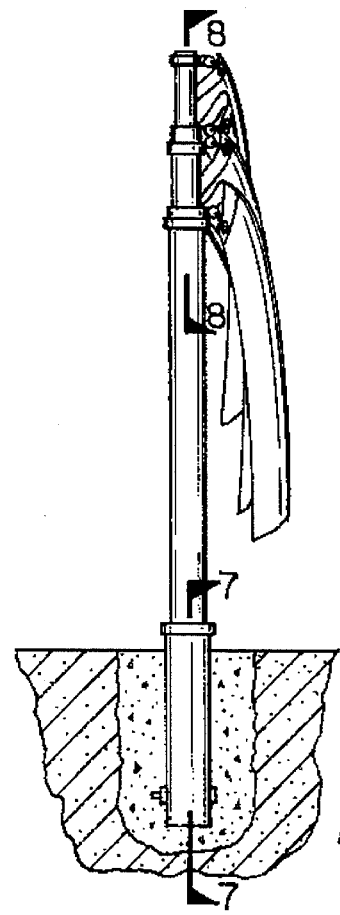
FIG. 2 is a side elevational view of the telescopic flagpole of FIG. 1 in a contracted state.

When the flagpole is in the extended state it may be "locked" into that state, as will be described below, to prevent inadvertent or unauthorized contraction of the flagpole, as well as to limit access to the flags flying thereon. When the flagpole is lowered to a contracted state as shown in FIG. 2, the flags 22 and 26 can be easily inspected or removed. It should be noted that the flagpole does not require ropes and pulleys to raise and lower the flags. Ropes for a tall flagpole are expensive and deteriorate rapidly. Additionally, a rope causes an aggravating clanging noise against the pole in a brisk wind. When the rope twists, as it is wont to do, the pulley jams. Additionally, a rope raised flag is a magnet for vandals who derive pleasure from slicing the rope and thieves who covet the flags.

FIG. 3 is a sectional view of the telescopic flagpole of FIG. 1 taken along line 3—3, which illustrates the base 10 embedded in a fixative, such as cement. A bolt 28 extends through holes on opposite sides of the base 10 and is secured to the base with a nut 30. The bolt 28 limits penetration of the first segment 12 into the base 10. In one embodiment, the first segment 12 extends into the base 10 about sixteen inches. Because the bolt 28 extends into the fixative, it inhibits rotational movement of the base 10 with respect to the fixative. Other protuberances may be added to the base 10 as desired to further inhibit rotational movement of the base.

The first segment 12 has a cylindrical plug 32 secured to one end with a counter-sunk screw. A collar 36 snugly engages both the base 10 and the first segment 12. In an exemplary embodiment, the collar is fabricated from polycarbonate, however other materials are acceptable. A first collar screw 38 secures the collar 36 to the first segment 12 and a second collar screw 40 secures the collar to the base 10. Thus, the combination of weight of the flagpole as applied through the first segment 12 inserted into the base 10, and the screw tightened collar 36 secure the flagpole in place.

Although the collar 36 can be secured to the base 10 with a single screw 40, an additional screw 40' can also be provided. Similarly, an additional screw 38' can help secure the collar 36 to the first segment 12. With respect to the engagement of the screws and the first segment 12, an end portion of the screw can be pressed firmly against the first segment, as shown with respect to screws 38 and 40. Alternatively, a portion of one or more screws can be passed into or through a wall portion of the first segment 12, as shown with respect to screws 38' and 40' to provide enhanced security/safety.

To hinder or prevent unauthorized or accidental disengagement or removal of the first segment 12 from the base 10 by loosening either or both of the first or second security/safety collar screws 38, 40, and/or 38', 40', respectively, and to reduce unsightly or hazardous protrusions, the first and second collar screws can be counter-sunk into the collar 36 and be provided with atypical screw heads (i.e., not Phillips or straight heads) such as Allen type heads. Additional security can be provided by heads having unique shapes that are only engagable by complementary shapes on a tool provided with the flagpole.

In an exemplary embodiment, the base 10 is fabricated from a high strength, low-cost plastic. In addition to isolating the first segment 12 from corrosive elements in and on the ground, should it be desired to relocate the flagpole the first segment 12 can be removed from the base 10 and provided with a different base at an alternate location. The base 10 can subsequently be easily cut-off or melted to ground level, as a large block of fixative might be too troublesome to excavate. Alternatively, a number of inexpensive bases can be provided at different sites and one or more flagpoles shuffled among them as desired.

FIG. 4, a sectional view of the telescopic flagpole of FIG. 1 taken along line 4—4, illustrates the first segment 12 engaged with the second segment 14. The second segment 14 includes an end plug 42 to which a resilient bumper 44 is affixed. Alternatively, the resilient bumper 44 can be secured to the upper face of plug 32. In either configuration, when the flagpole is in a collapsed state, the bumper 44 separates the plug 32 from the plug 42.

The second segment 14 further includes a locking device 46 for engaging the first segment 12 to limit relative axial movement. The locking device 46 comprises a biasing element 48, such a helical spring, that biases a pin 50 outwardly through a hole in the wall of the second segment with which the pin is aligned, against the inner wall of the first segment 12 when the second segment 14 is withdrawn into the first segment 12. When the pin 50 is aligned with a hole in the wall of the first segment 12 as the second segment 14 is withdrawn from the first segment, the pin is urged through the hole by the biasing element 48, thus impeding further relative axial movement of the first segment and the second segment. Retraction of the pin 50 within the first segment 12 permits relative axial movement again.

A bushing 52 secured to the distal end of the first segment 12 through which the second segment 14 is insertable, includes a security/safety screw 54 that is counter-sunk into the bushing in the same manner as the security/safety screw 38, 38' in the collar 36. Also as described above with respect to screw 38, 38', the security/safety screw 54 is provided with an atypical screw head to make it difficult or impossible to remove without the proper tool. When tightened, the end of the screw shank presses against, passes into, or passes through the second segment 14 while a portion of the shank and the head of the screw 54 remains engaged with the busing 52, thus inhibiting relative axial movement of the first segment 12 with respect to the second segment 14 even if the pin 50 is depressed and the locking device 46 is disengaged. This feature helps to ensure that collapsing the flagpole is a deliberate act. In an exemplary embodiment, the bushing 52 is fabricated from polycarbonate, however other materials are acceptable.

The above-described configuration of segments 12 and 14 is repeated in similar fashion for any number of segments that various embodiments of the flagpole may include, with the appropriate modification in diameter of subsequent segments, end caps, and bushings. Accordingly, FIG. 5 is a sectional view of the telescopic flagpole of FIG. 1 taken along line 5—5, which illustrates the second segment 14 engaged with the third segment 16. The third segment 16 includes an end plug 56 to which a resilient bumper 58 is affixed. When the flagpole is in a collapsed state, the bumper 58 abuts the locking device 46. Alternatively, the bumper 58 can be attached to the upper surface of the locking device 46. The third segment 16 includes a locking device 60 like the locking device 46 of the second segment 14 for engaging the second segment 14 as described above to limit relative axial movement. A bushing 62 secured to the distal end of the second segment 14, through which the third segment 16 is insertable, includes a security/safety screw 64 like the security/ safety screws 38, 38' and 54 described above.

In the illustrated embodiment, the third swivel 24, or flag attachment point, is configured as a collar having an eyelet 66. The third swivel 24 rotates freely about the second segment 14 and moves axially with freedom between the bushing 62 and the bushing 52.

Referring to FIG. 6, a sectional view of the telescopic flagpole of FIG. 1 taken along line 6–6 shows details of the distal end of the third segment 16. An end cap 68 permits the first swivel 18 having an eyelet 70 to rotate freely about the third segment 16 while maintaining the first swivel at a fixed axial position on the third segment. The second swivel 20, having eyelets 72 and 74, rotates freely about the third segment 16 and moves axially with freedom between the bushing 62 and the first swivel 18. The second and third swivels 20 and 24, respectively, are heavy enough to pull one edge of each flag 22, 26 taught as shown in FIG. 1. In like manner, additional swivels can be added for additional flags as desired.

Figure 7:
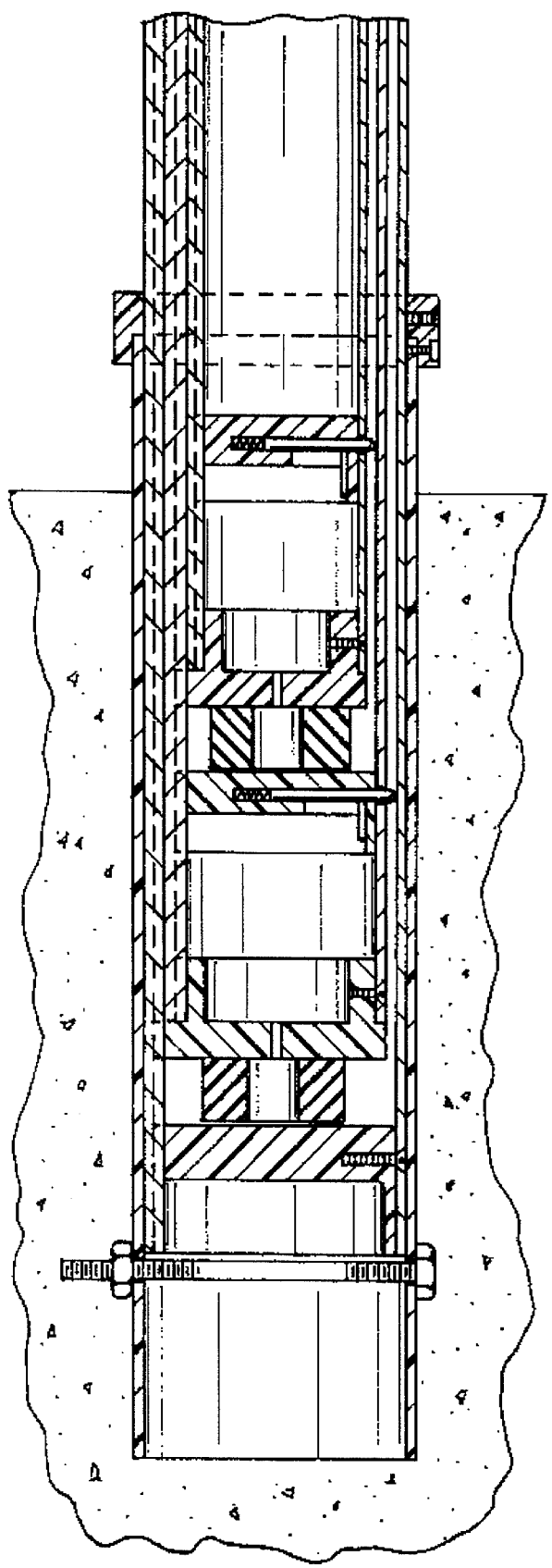
FIG. 7 is a sectional view of the telescopic flagpole of FIG. 2 along line 7—7.
Figure 8:
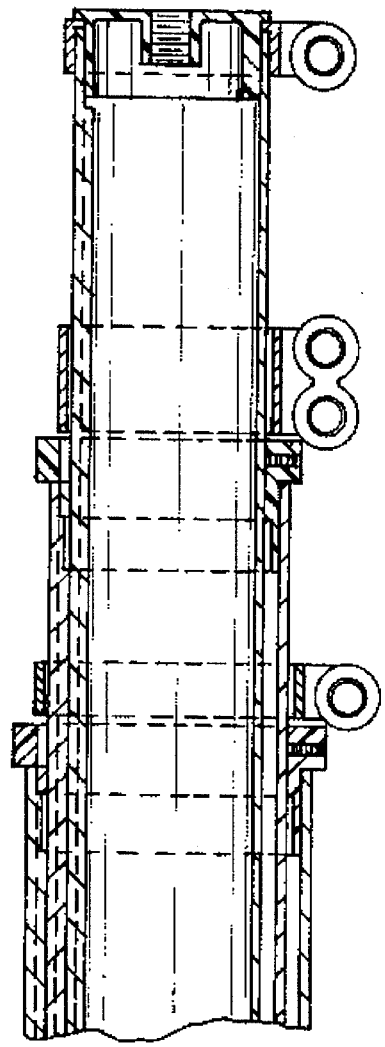
FIG. 8 is a sectional view of the telescopic flagpole of FIG. 2 along line 8—8.

FIG. 7 is a sectional view of the telescopic flagpole of FIG. 2 taken along line 7—7 and FIG. 8 is a sectional view of the telescopic flagpole of FIG. 2 taken along line 8—8. These figures show the relationship of the elements of the flagpole when it is in a completely contracted state.

In the preceding description, safety/security features of the flagpole have been described related to axial locking the segments with respect to each other, as well as features for securing the first or lowermost segment 12 to the base 10. Another feature of the invention, relating to the prevention of relative rotational movement of the segments with respect to each other, is described below.

To facilitate rapid and assured alignment of the hole through an outer segment with the pin insertable therethrough of the locking device of the adjacent inner segment, the inner and outer segments can be radially "locked" so that only relative axial movement is required to cause the pin to snap into the hole. For example, radial locking can be accomplished by providing the inner wall of the outer segment with a projection, such as a ridge, that extends inwardly from the inner wall to engage a receiver, such as a slot, on an outer surface of the inner segment. Similarly, radially locking can be accomplished by providing the inner wall of the outer segment with a receiver and the outer surface of the inner segment with a projection. An exemplary embodiment of the anti-rotation feature is shown in FIGS. 9–11.

Figure 9:
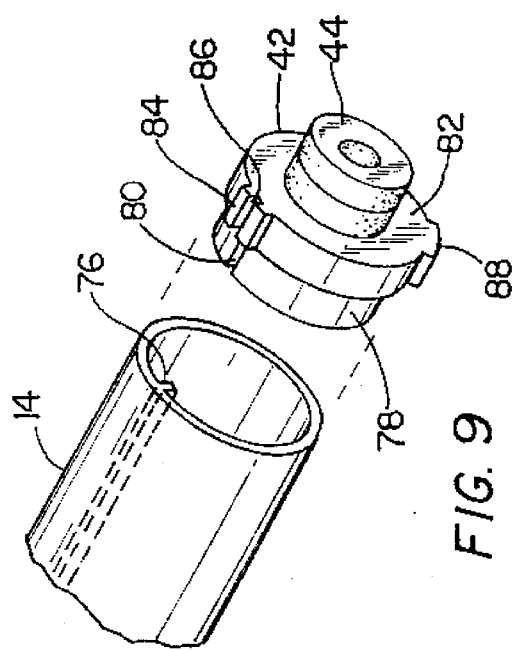
FIG. 9 is an exploded view of one end of a flagpole segment and an end cap.

FIG. 9 is an exploded view of one end of the second segment 14 and the end plug 42. The second segment 14 includes a longitudinal projection or ridge 76 projecting from the inner wall of the segment. The ridge 76 can extend the entire length of the second segment 14 or only a portion thereof. The end plug 42 has a neck 78 dimensioned to fit snugly into the end of the second segment 14. The neck 78 includes a receiver, such as a recess or notch 80 for receiving a portion of the ridge 76 therein to ensure that the end cap 42 is inserted into the second segment 14 in a predetermined radial orientation. The end plug 42 also includes a collar 82 from which projects at least one lug 84 that has a recess or notch 86 therein. A second lug 88 and one or more additional lugs (not shown) can also project from the collar 82 to provide the second segment 14 with radial stability, or resistance to wiggling, when it is inserted into the first segment 12.

Figure 10:
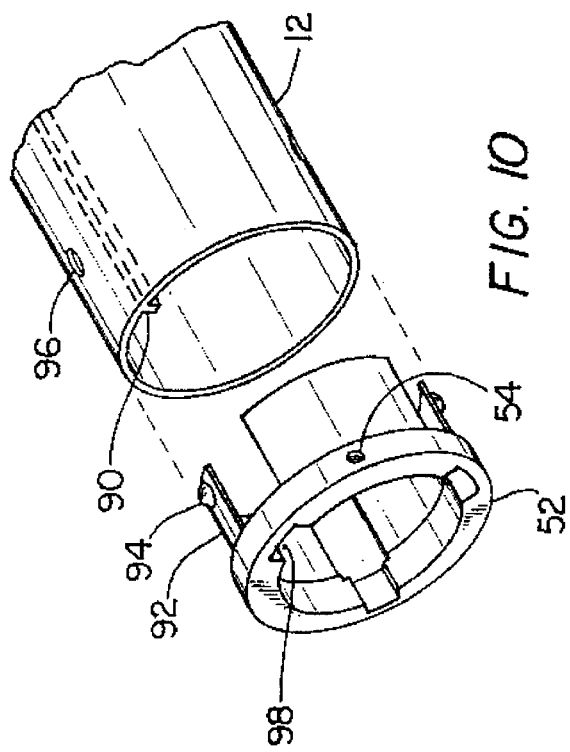
FIG. 10 is an exploded view of one end of a flagpole segment and an end bushing.
Figure 11:
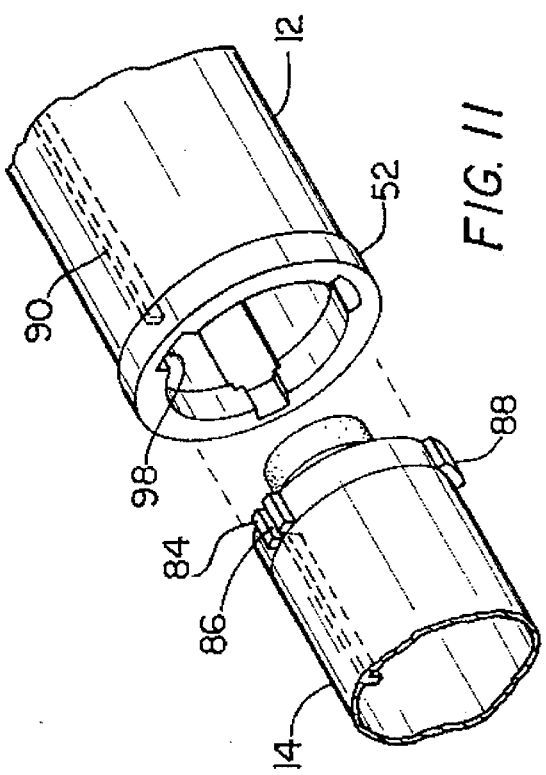
FIG. 11 is a perspective view of the ends of the flagpole segments illustrated in FIGS. 9 and 10 aligned for mating.

FIG. 10 is an exploded view of one end of the first segment 12 and an embodiment of the end bushing 52. The first segment 12 includes a longitudinal projection or ridge 90 projecting from the inner wall of the segment. The ridge 90 can extend the entire length of the first segment 12 or only a portion thereof. The bushing 52 includes one or more resilient elements 92 spaced about the periphery of the bushing and dimensioned to fit snugly into the end of the first segment 12. One or more of the resilient elements can include a protuberance 94 that extends into a recess or through a hole 96 in the wall of the first segment 12 to ensure that the bushing 52 is inserted into the first segment 12 in a predetermined radial orientation and to help secure the bushing to the first segment. In the illustrated embodiment, the exterior of the second segment 12 abuts the interior face of the resilient element 92, forcing the protuberance 94 to remain engaged with the first segment 12. Thus the bushing 52 is locked into place and cannot be removed unless the second segment 14 is withdrawn from the first segment 12.

The bushing 52 includes a receiver, such as a recess or notch 98 for receiving the lug 84 to align the notch 86 in the lug 84 with the ridge 90 of the first segment 12. Additional notches in the bushing are provided in accordance with the number of lugs on the collar 82 of the end plug 42. In the illustrated embodiment there are three lugs on the collar 82 and three notches in the bushing 52.

FIG. 11 is a perspective view of the second segment 14 and the first segment 12, illustrated in FIG. 9 and 10 respectively, aligned for mating. In this view lug 84 and notch 86 are aligned with notch 98 and ridge 90. Once the second segment 14 is inserted into the first segment 12 and the ridge 90 is inserted into the notch 86, the segments cannot be rotated with respect to each other.

It should be noted that even though the anti-rotation feature has been described with respect to the first segment 12 and the second segment 14, this feature can be integrated with any or all of the other segments in a similar manner. It is also contemplated that the inner segment have a receiver or recess therein commensurate in length with the projection of the outer segment, wherein the recess performs the function of the notch in the lug of the end plug.

Figure 12:
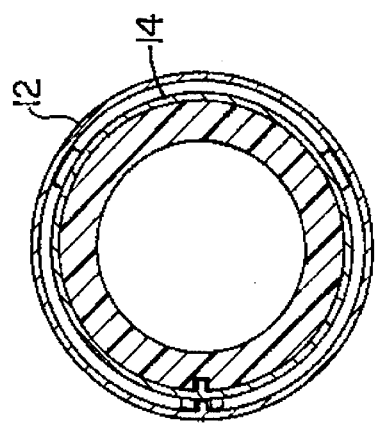
FIG. 12 is a sectional view of the telescopic flagpole of FIG. 4 taken along line 12—12.

The concentric relationship of the first segment 12 and the second segment 14 is shown in FIG. 12 which is a sectional view of the telescopic flagpole of FIG. 4 taken along line 12—12. Also evident in this view is the smooth exterior surface provided to each of the segments by enclosing the notches, ridges, and lugs essential to achieve the above described-benefits related to ease of installation, enhanced safety and theft protection within the protective confines of the flagpole.

Although the invention has been shown and described with respect to exemplary embodiments thereof, various other changes, omissions and additions in form and detail thereof may be made therein without departing from the spirit and scope of the invention.

What is claimed is:

1. A telescopic flagpole comprising:

a first tubular segment having an inner wall and including a projection from said inner wall;

a second tubular segment slidably engageable with said first tubular segment;

a plug in one end of said second tubular segment, said plug including a recess therein for engaging said projection; and a bushing fitted to one end of said first tubular segment that aligns said recess with said projection when said plug is passed through said bushing.

2. The telescopic flagpole of claim 1, further comprising a safety/security screw having a head and a shank, said shank movable through a portion of said bushing to engage said second tubular segment, as at least a portion of said head engages said bushing, to inhibit movement of said first tubular segment with respect to said second tubular segment.

3. The telescopic flagpole of claim 1, wherein said bushing includes a resilient element having a protuberance thereon and said first segment includes one of a recess and a hole for receiving said protuberance.

4. A telescopic flagpole comprising:

a first tubular segment including
      an inner wall,
      an opening through said inner wall,
      an inwardly facing projection from said inner wall, and
      a bushing fitted to a first end of said first tubular segment, said bushing including
         a resilient element having a protuberance thereon extending into said opening through said inner wall, and
         a notch; and a second tubular segment disposable within said first tubular segment, said second tubular segment including
      an end plug fitted to one end of said second tubular segment, said end plug including a lug having a notch therein, said lug insertable through said notch in said bushing to align said notch in said lug with said inwardly facing projection from said inner wall of said first tubular segment.

5. A telescopic flagpole comprising:

a first tubular segment having an inner wall and including a projection from said inner wall;

a second tubular segment slidably engagable within said first tubular segment and including a receiver for engaging said projection;

a plug in one end of said second tubular segment, said plug including a recess therein for engaging said projection;

a bushing fitted to one end of said first tubular segment that aligns said recess with said projection when said plug is passed through said bushing;

a resilient element having a protuberance thereon extending into said first tubular segment from said bushing;

a radially facing hole in said first tubular segment for receiving said protuberance;

a safety/security screw having a head and a shank, said shank being movable through a portion of said bushing to engage said second tubular segment, as at least a portion of said head engages said bushing, to inhibit movement of said first tubular segment with respect to said second tubular segment;

a second radially facing opening in said first tubular segment; and a locking device housed within said second tubular segment, said locking device including a radially biased pin, wherein alignment of said opening with said pin allows said pin to be biased through said opening, thereby inhibiting axial movement of said first tubular segment with respect to said second tubular segment.

* * * * *